United States Patent
Wang et al.

(10) Patent No.: US 9,949,201 B2
(45) Date of Patent: Apr. 17, 2018

(54) SYSTEMS AND METHODS FOR REGULATING WEATHER INFORMATION COLLECTION

(71) Applicant: Honeywell International Inc., Morristown, NJ (US)

(72) Inventors: Haiming Wang, Beijing (CN); Yi Zhong, Shanghai (CN); Leo Wang, Beijing (CN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/865,037

(22) Filed: Sep. 25, 2015

(65) Prior Publication Data

US 2017/0094590 A1    Mar. 30, 2017

(51) Int. Cl.
| | |
|---|---|
| H04B 7/00 | (2006.01) |
| H04W 48/16 | (2009.01) |
| G01W 1/00 | (2006.01) |
| H04W 4/04 | (2009.01) |
| G01S 5/00 | (2006.01) |
| G01S 7/00 | (2006.01) |
| G01S 13/95 | (2006.01) |
| G08G 5/00 | (2006.01) |

(52) U.S. Cl.
CPC ........... *H04W 48/16* (2013.01); *G01S 5/0027* (2013.01); *G01S 7/003* (2013.01); *G01S 13/953* (2013.01); *G01W 1/00* (2013.01); *G08G 5/0013* (2013.01); *G08G 5/0026* (2013.01); *G08G 5/0091* (2013.01); *H04W 4/04* (2013.01)

(58) Field of Classification Search
CPC .......... H04W 48/16; H04W 4/04; G01W 1/00
USPC ............................ 455/515, 67.4, 1, 431, 98
See application file for complete search history.

(56) References Cited

U.S. PATENT DOCUMENTS 5,459,469 A * 10/1995 Schuchman .......... G01S 13/765
                                                   342/32
6,043,756 A *  3/2000 Bateman ................ G01S 7/003
                                                   340/945

(Continued)

FOREIGN PATENT DOCUMENTS

| EP | 3067710 | 9/2016 |
|---|---|---|
| JP | 200827011 | 2/2008 |
| JP | 2012089088 | 5/2012 |

OTHER PUBLICATIONS

Wang et al., "Systems and Methods for Collecting Weather Information for Selected Airspace Regions", "U.S. Appl. No. 14/865,039, filed Sep. 25, 2015", pp. 1-26, Published in: US.

(Continued)

*Primary Examiner* — Md Talukder
(74) *Attorney, Agent, or Firm* — Fogg & Powers LLC (57) ABSTRACT

Systems and methods for regulating weather information collection are provided. In one embodiment, a method for managing the collection of weather information comprises: determining whether or not a weather data processing system is in a state open to receiving weather information; communicating to a first aircraft when the weather data processing system is in a state open to receiving weather information; and upon receiving weather information at the weather data processing system from the first aircraft, transmitting a signal indicating that the weather data processing system is not in a state open to receiving weather information.

19 Claims, 9 Drawing Sheets

(56) References Cited

U.S. PATENT DOCUMENTS

| | | | |
|---|---|---|---|
| 6,181,260 B1* | 1/2001 | Simon | G01W 1/10 340/945 |
| 6,501,392 B2 | 12/2002 | Gremmert et al. | |
| 7,069,147 B2* | 6/2006 | Manfred | G01W 1/08 340/971 |
| 7,471,995 B1 | 12/2008 | Robinson | |
| 7,633,428 B1 | 12/2009 | McCusker et al. | |
| 8,121,593 B2* | 2/2012 | Pandit | H04B 7/18506 370/316 |
| 8,314,730 B1* | 11/2012 | Musiak | G01S 7/003 342/25 B |
| 8,344,933 B1 | 1/2013 | Kronfeld et al. | |
| 8,604,963 B1* | 12/2013 | Kronfeld | G01S 7/003 342/26 B |
| 8,626,428 B2 | 1/2014 | Ramaiah et al. | |
| 8,811,265 B2 | 8/2014 | Horvath | |
| 8,965,699 B2 | 2/2015 | McDonald | |
| 9,467,364 B2 | 10/2016 | Breshears | |
| 2002/0039072 A1* | 4/2002 | Gremmert | G01S 7/003 340/945 |
| 2002/0075179 A1* | 6/2002 | Hudson | G01S 13/765 342/30 |
| 2005/0278120 A1* | 12/2005 | Manfred | G01W 1/08 702/2 |
| 2006/0251100 A1* | 11/2006 | Kim | H04W 48/16 370/432 |
| 2009/0012663 A1 | 1/2009 | Mead et al. | |
| 2009/0209196 A1* | 8/2009 | Haverty | H04K 3/28 455/1 |
| 2009/0219197 A1 | 9/2009 | Bunch | |
| 2010/0042275 A1 | 2/2010 | Kirk | |
| 2010/0245164 A1 | 9/2010 | Kauffman | |
| 2010/0332056 A1* | 12/2010 | Kirk | G01W 1/04 701/14 |
| 2011/0054718 A1 | 3/2011 | Bailey | |
| 2011/0057830 A1* | 3/2011 | Sampigethaya | G01S 5/0072 342/36 |
| 2011/0183602 A1* | 7/2011 | Tietz | H04K 3/43 455/1 |
| 2011/0187588 A1 | 8/2011 | Khatwa et al. | |
| 2012/0259549 A1 | 10/2012 | McDonald | |
| 2012/0274484 A1 | 11/2012 | Zimmer et al. | |
| 2013/0006450 A1 | 1/2013 | Del Amo Blanco et al. | |
| 2013/0033387 A1* | 2/2013 | Trope | G01C 23/00 340/971 |
| 2013/0273839 A1 | 10/2013 | Breshears | |
| 2014/0269474 A1* | 9/2014 | Zhu | H04W 52/0216 370/311 |
| 2014/0348060 A1* | 11/2014 | Li | H04B 7/024 370/328 |
| 2014/0372038 A1* | 12/2014 | Leblanc | G01C 21/3691 702/3 |
| 2015/0310747 A1* | 10/2015 | Frolik | B64D 45/00 340/971 |
| 2016/0266249 A1* | 9/2016 | Kauffman | G01S 7/003 |
| 2016/0285541 A1* | 9/2016 | Liu | H04B 7/18506 |
| 2017/0092139 A1 | 3/2017 | Wang et al. | |
| 2017/0214743 A1* | 7/2017 | Goldstein | H04L 67/12 |

OTHER PUBLICATIONS

Airbus, "Flight Operations Briefing Notes", "Adverse Weather Operations Optimum Use of the Weather Radar", Feb. 2007, pp. 1-17, Publisher: Airbus.

Phak, "Chapter 12 Aviation Weather Services", "Pilot's Handbook of Aeronautical Knowledge", Oct. 3, 2014, pp. 1-26, Publisher: Federal Aviation Administration.

Werth, "Airborne Weather Radar Limitations", "The Front", Dec. 2014, pp. 1-4, Publisher: National Weather Service.

European Patent Office, "Extended Search Report from EP Application No. 16190018.8 dated Jan. 26, 2017", "from Foreign Counterpart of U.S. Appl. No. 14/865,037", dated Jan. 26, 2017, pp. 1-12, Published in: EP.

European Patent Office, "Extended European Search Report from EP Application No. 16190013.9 dated Feb. 24, 2017", "from Foreign Counterpart of U.S. Appl. No. 14/865,039", dated Feb. 24, 2017, pp. 1-7, Published in: EP.

European Patent Office, "Communication under Rule 71(3) EPC from EP Application No. 16190018.8 dated Jul. 14, 2017", "from Foreign Counterpart of U.S. Appl. No. 14/865,037", dated Jul. 14, 2017, pp. 1-38.

US Patent and Trademark Office, "Office Action", "U.S. Appl. No. 14/865,039", Sep. 8, 2017, pp. 1-48, Published in: US.

US Patent and Trademark Office, "Notice of Allowance", "From U.S. Appl. No. 14/865,039", Dec. 6, 2017, pp. 1-13, Published in: US.

* cited by examiner

SYSTEMS AND METHODS FOR REGULATING WEATHER INFORMATION COLLECTION

CROSS-REFERENCE TO RELATED APPLICATIONS

This application is related to co-pending U.S. patent application Ser. No. 14/865,039 entitled "SYSTEMS AND METHODS FOR COLLECTING WEATHER INFORMATION FOR SELECTED AIRSPACE REGIONS", which was filed on even date herewith and incorporated by reference in its entirety.

BACKGROUND

For pilots of commercial and other aircraft, knowledge of weather data, in particular knowledge regarding hazardous weather along their planned route, is critical for safe operation of an aircraft. Presently, weather radar equipped onboard the aircraft is utilized to gather weather data for the flight path ahead. Further, in recent years, a connected radar concept has been proposed as the evolution of current weather radar system. Under the connected radar concept, weather information from various aircraft may be uploaded and downloaded and thus widely shared, increasing the amount and diversity of weather data available to the pilot. Such a system also benefits from the fact that weather information sensed by aircraft weather radar is typically more accurate than ground sensed weather data. One problem with the connected radar concept, however, is the potential additional heavy burden placed on air-ground communication datalinks. Commercial aircraft operations, in particular, are experiencing evolving and increasing utilization of air-ground communication datalinks for air traffic control, airline operations specific applications, and in-flight data services for passengers. Introduction of air-ground uploads and downloads of detailed weather information will only add to the burden of the wireless networks utilized by aircraft.

For the reasons stated above and for other reasons stated below which will become apparent to those skilled in the art upon reading and understanding the specification, there is a need in the art for alternate systems and methods for regulating weather information collection.

SUMMARY

The Embodiments of the present invention provide methods and systems for managing weather information collection and will be understood by reading and studying the following specification.

Systems and methods for regulating weather information collection are provided. In one embodiment, a method for managing the collection of weather information comprises: determining whether or not a weather data processing system is in a state open to receiving weather information; communicating to a first aircraft when the weather data processing system is in a state open to receiving weather information; and upon receiving weather information at the weather data processing system from the first aircraft, transmitting a signal indicating that the weather data processing system is not in a state open to receiving weather information.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present disclosure provide system and methods for regulating weather information collection at weather data collection ground stations. In some embodiments, aircraft that participate in sharing their on-board collected weather data store the location of ground stations having weather data processing systems. When these aircraft approach within a threshold proximity of such a ground station (for example, within 100 nautical miles), they check for a permission signal from the weather data processing system indicating whether or not they have permission to transmit their weather information to the ground station. Since aircraft flying in the same direction and within a relatively close proximity should be observing and/or experiencing similar weather conditions it is unnecessary for every aircraft approaching the ground station to transmit its set of on-board generated weather data to the ground station. Accordingly, some aircraft will obtain permission to transmit weather data to the ground station when they are within the threshold proximity, and others will not. In some implementations, when the ground station is in a state open to receiving weather data, a first aircraft to enter the threshold proximity and offer to transmit weather data is permitted to do so. If the first aircraft is able to successfully transfer its weather data to the ground station, then for some predetermined period of time, other aircraft flying in the same direction as the first aircraft and entering the threshold proximity after the first aircraft are denied permission to transmit their weather data.

As further explained below, in other embodiments, aircraft need not keep track of their own positions relative to the ground station, but instead rely on beacons or queries transmitted from the ground to determine if an when they have permission to transmit their weather information to the ground station. For example, in one embodiment, the ground station transmits a beacon indicating whether or not it is open to receive weather information. The first aircraft to receive a permissive beacon will transmit its weather data. Upon the successfully transfer of the weather data to the ground station, the beacon changes to a "do-not-transmit" indicate that the ground station is no longer open to receive weather information. The "do-not-transmit" beacon may be maintained for some predetermined period of time, or based on some other criteria, until the ground station is again open to receive weather data. At that point, the ground station returns to transmitting a beacon indicating that it is open to receive weather information. In another embodiment, the aircraft that participate in sharing their on-board collected weather data are tracked by the ground station and the ground station identifies when one of these aircraft enters a threshold proximity of the ground station when the ground station is in a state open to receiving weather data. The ground station then queries that aircraft to request a downlink of its weather data, then refrains from requesting weather data from other aircraft traveling in the same direction for a predetermined period of time, or based on some other criteria until the ground station is again open to receive weather data.

Figure 1:
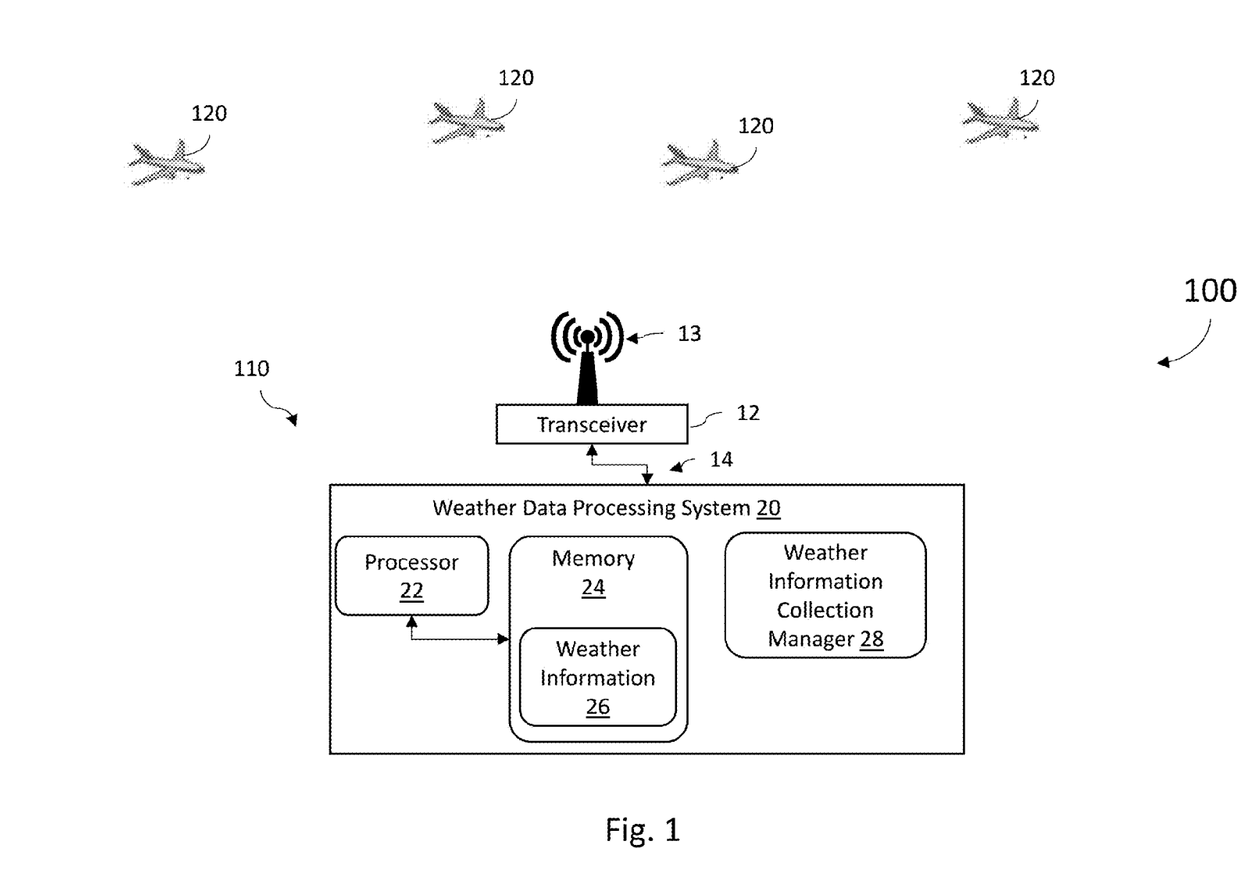
FIG. 1 is a diagram illustrating a Ground Station Weather Data Collection System of one embodiment of the present disclosure.

FIG. 1 is an illustration of a weather collection processing system 100 that includes a weather information ground station 110 that implements weather information management according to one embodiment of the present disclosure. System 100 comprises ground station 110 and a plurality of aircraft 120 flying within the operating range of the ground station 110 and are in communication with the ground station 110. Ground station 110 comprises at least one transceiver 12 coupled to a weather data processing system 20. The at least one transceiver 12 is coupled to at least one antenna 13 and incorporates electronics and other components to establish bidirectional wireless data communication links with avionics aboard the aircraft 120. Such data communication links may include, but are not limited to, received Automatic Dependent Surveillance-Broadcast (ADS-B) messages and weather data, Aircraft Communications Addressing and Reporting System (ACARS) datalinks and/or satellite communications (SATCOM). It should be appreciated that in alternate implementations, transceiver 12 and weather data processing system 20 may be located at the same physical ground facility or instead located at some remote distance from each other and connected by a communication link 14.

It should be appreciated that in alternate implementations, transceiver 12 and weather data processing system 20 may be located at the same physical ground facility or instead located at some remote distance from each other and connected by a communication link 14. Weather data processing system 20 comprises at least one processor 22 coupled to a memory 24 which may be used for storing weather information 26 collected from, and shared with, aircraft 102. Also as shown in FIG. 1, weather data processing system 20 further comprises a weather information collection manager 28 according to one embodiment of the present disclosure which may be implemented as a computer executable function or module executed by processor 22.

In operation, when an aircraft 120 is within the predefined operating range of ground station 110 (referred to herein as the threshold proximity) and has generated a new set of aircraft collected weather data, it can wirelessly communicate the weather data to weather information collection manager 28 but only when weather information collection manager 28 is in a state where it is open to receiving new weather information from that aircraft as described for any of the various example embodiments and implementations provided below.

Figure 2A:
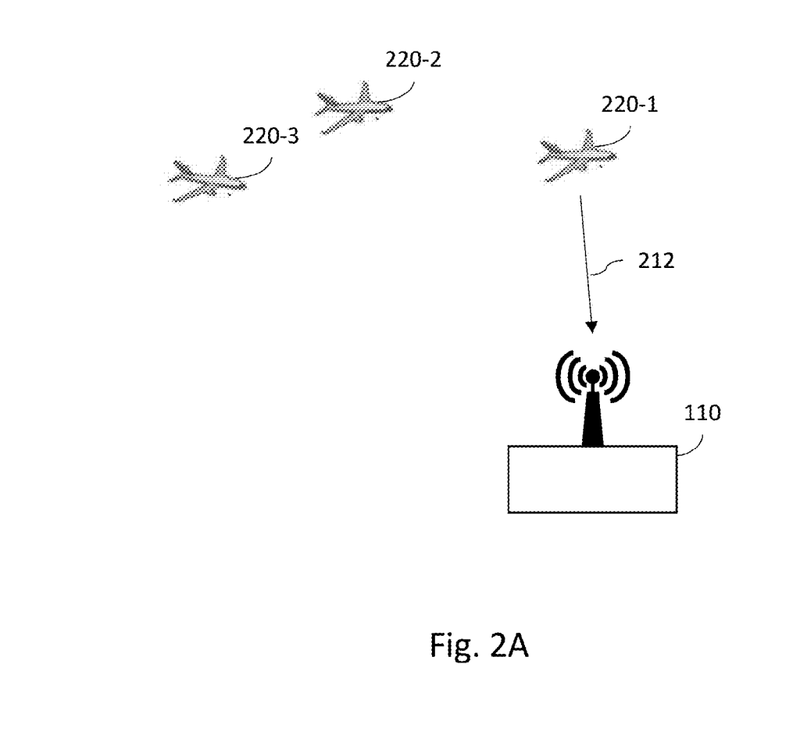
FIGS. 2A, 2B and 2C illustrate an example implementation of a Ground Station Weather Data Collection System of one embodiment of the present disclosure.
Figure 2B:
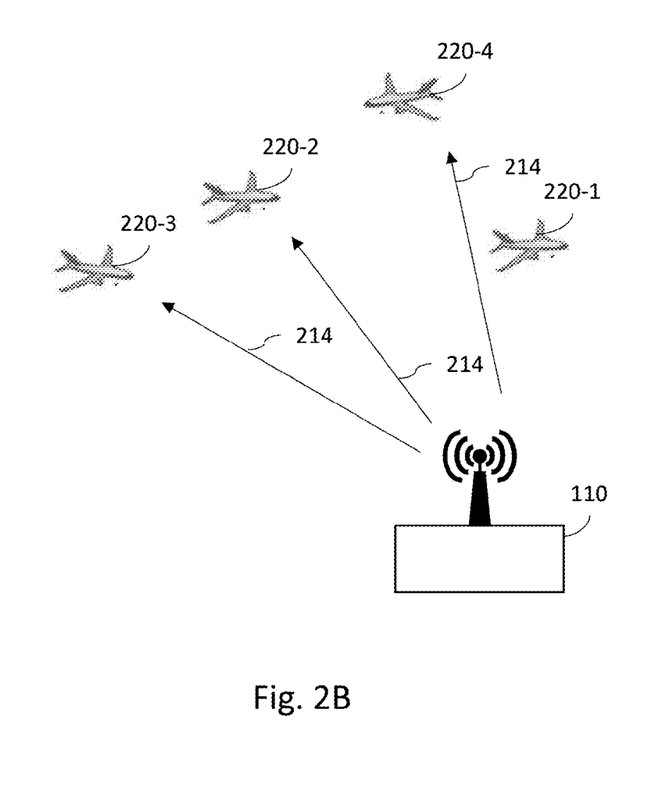

FIGS. 2A and 2B are diagrams illustrating one implementation of system 100 in operation in which aircraft 120 compare their positions with the position of a ground station determining when it is within a threshold distance of the ground station. By comparing its own position with the ground station position, an aircraft can know when it has arrived at the specific ground station. In one embodiment, when a first aircraft is within a threshold proximity it listens for a permission signal, and if permitted, it will send its weather data to the ground station.

For example, in FIG. 2A, a first aircraft 220-1 includes a memory that includes the position of ground stations (such as station 110) having weather data collection systems. Using on-board avionics, aircraft 220-1 compares its own position with a stored position of ground station 110. From this comparison, when aircraft 220-1 determines that it is within a threshold proximity of ground station 110 (for example, 100 nautical miles), and has not received a signal and/or message telling it to refrain from transmitting weather information, it will transmit via a downlink 212 the weather information it has collected using its on-board weather sensors.

Other aircraft 220-2 and 220-3 are similarly equipped to aircraft 220-1 and are travelling in the same direction as 220-1. However, if they enter within the threshold proximity of ground station 110 shortly after aircraft 220-1, they need not transmit the weather information they have collected because their collected weather information should be similar to the weather information already supplied by the first aircraft 220-1. Therefore, after weather data processing system 20 has successfully received weather data from the first aircraft 220-1, weather information collection manager 28 will transmit, via transceiver 12, a do-not-transmit signal 214, as shown in FIG. 2B. When the other aircraft 220-2 and 220-3 receive the do-not-transmit message, those aircrafts will refrain from transmitting weather information for some specified duration of time. As such, in this example, only the aircraft 220-1 that first arrived within the threshold proximity to ground station 110, and which did not receive the do-not-transmit message, will transmit the weather information.

In some embodiments, the do-not-transmit signal 214 specifies which aircraft it is applicable to, for example based on the direction the aircraft is travelling. For example, in one implementation the do-not-transmit signal 214 includes a direction flag that indicates a direction of flight for which its do-not-transmit message is relevant to. For example, in FIG. 2B, aircraft 220-4 is within the threshold proximity of ground station 110 and has received the do-not-transmit signal 214. However, because aircraft 220-4 is travelling in a different direction from that indicated by a direction flag conveyed in permission signal 214, it may proceed to transmit any weather information it has collected to ground station 110 in the same manner as aircraft 220-1.

Figure 2C:
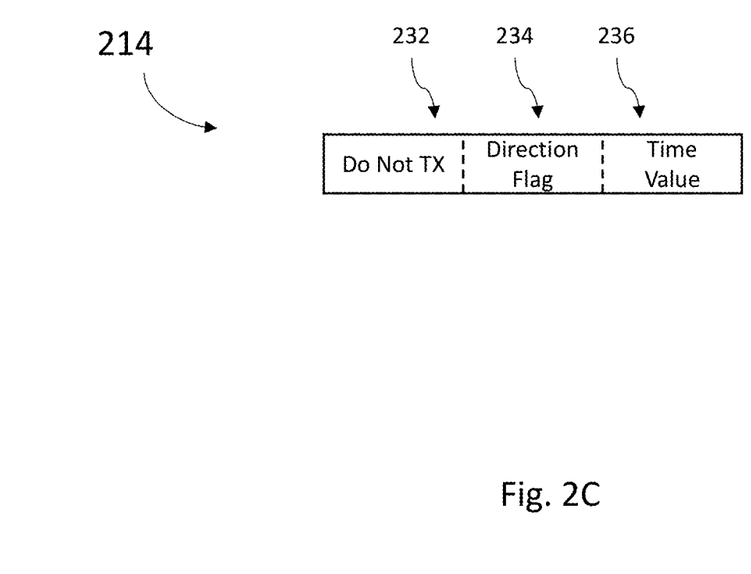

In one implementation, the do-not-transmit message is transmitted continuously and any aircraft receiving the do-not-transmit message will refrain from transmitting any weather information for a specific time duration (for example, 15 minutes). In such an implementation, when the other aircraft 220-2 and 220-3 travelling behind aircraft 220-1 receive the do-not-transmit signal 214, they will not attempt to send weather messages to the ground station 110 for that pre-defined time duration. Alternately, the do-not-transmit signal 214 may be transmitted just once (for example, after downlink of weather data from the first aircraft 220-1 is successfully completed) but also specify a refrain duration. In this case, the do-not-transmit signal 214 would further include a time value that indicates how long to wait before weather information may again be transmitted to the ground station 110. Before that time value is reached (or elapses), aircraft within the proximity of the ground station 110 will refrain from transmitting weather information. FIG. 2C illustrates one example of a do-not-transmit signal 214 which includes a do-not-transmit message field 232 as well as optional fields for a direction flag 234 and a time value 236 such as described above.

FIGS. 3A, 3B, 3C and 3D are diagram illustrating another implementation of system 100 in operation in which the ground station 110 employs a localized beacon signal 320 to communicate to aircraft 120 (shown by 310-1, 310-2 and 310-3 in this figure). Localized beacon signal 320 is controlled by weather information collection manager 28 to communicated to aircraft 310-1, 310-2 and 310-3 when ground station 110 (or more specially the weather data processing system 20) is in a state open to receiving weather data and when it is not. The beacon signal 320 is referred to as a "localized beacon signal" meaning that it is either transmitted at a low power and/or comprises a highly-directional beam so that only an aircraft flying through a specifically designated region of airspace will receive the beacon 320. When an aircraft travels through that region of airspace in which it receives the localized beacon signal 320, it may determine whether or not it has permission to transmit weather information to the ground station 110 based on the beacon signal 320. Further, it should be noted that the localized beacon signal 320 is aimed and adjusted to that when received by an aircraft (such as aircraft 310-1, for example) that aircraft know it is in a position within the threshold proximity/operating range of ground station 110 so that its on-board collected weather data would be relevant to ground station 110.

Figure 3A:
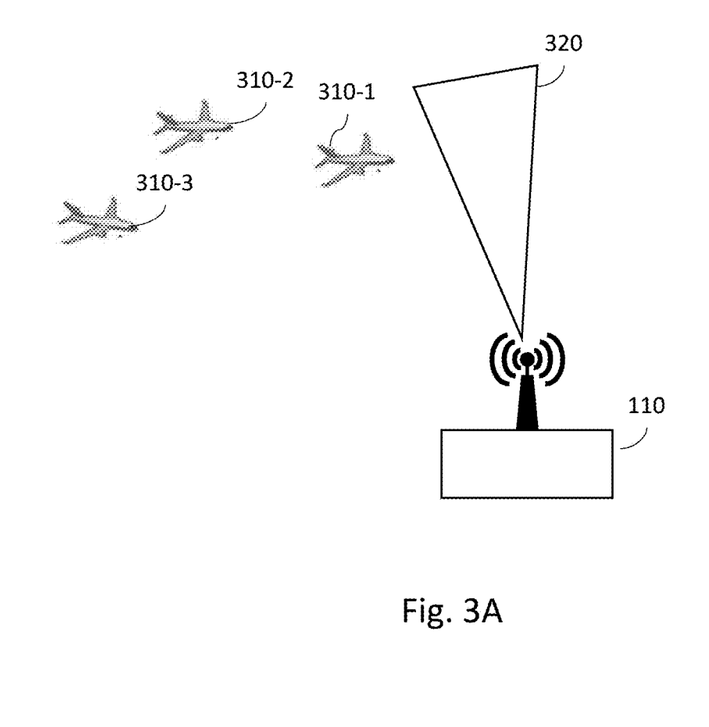
FIGS. 3A, 3B, 3C, 3D and 3E illustrate another example implementation of a Ground Station Weather Data Collection System of one embodiment of the present disclosure.
Figure 3B:
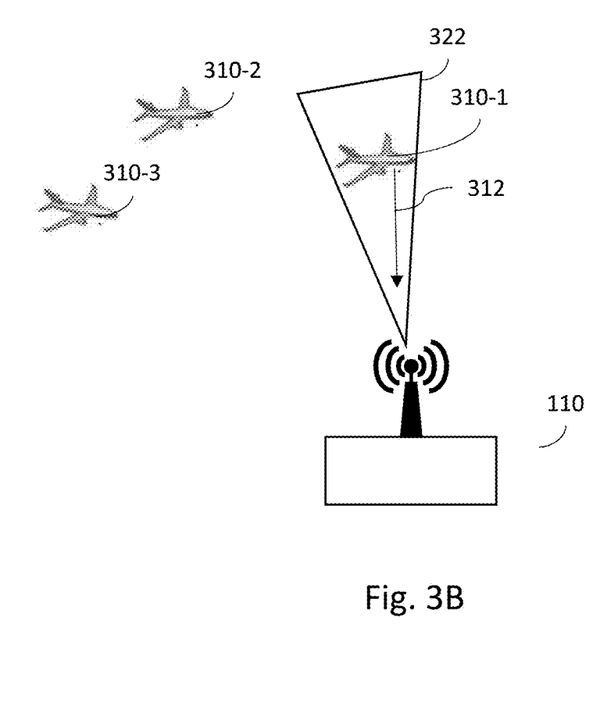

As shown in FIG. 3B, aircraft 310-1 is equipped with on-board avionics to monitor for the presence of the beacon 320 from ground station 110. When aircraft 310-1 travels into a region of airspace where it can detect beacon 320, the on-board avionics determines from beacon 320 whether it has permission to transmit its weather data to ground station 110. When ground station 110 is in a state open to receiving weather data, ground station 110 transmits beacon 320 as a permissive beacon 322 as shown in FIG. 3B. A permissive beacon 322 indicates that aircraft 310-1 has permission to transmit weather data. Therefore, in one embodiment, when aircraft 310-1 detects a permissive beacon 322, it will transmit via a downlink 312 the weather information it has collected using its on-board weather sensors.

Figure 3C:
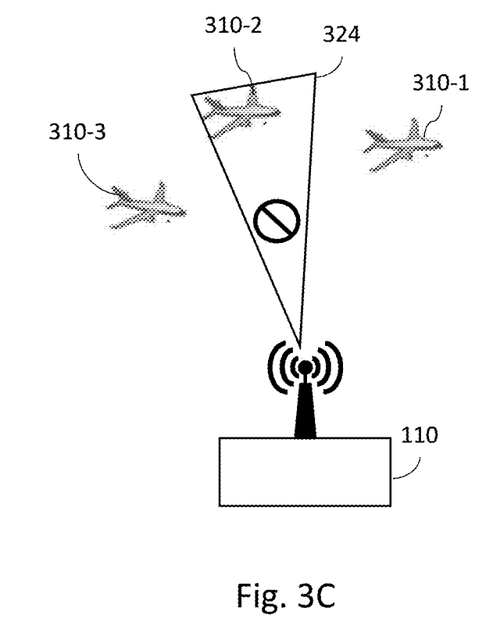
Figure 3D:
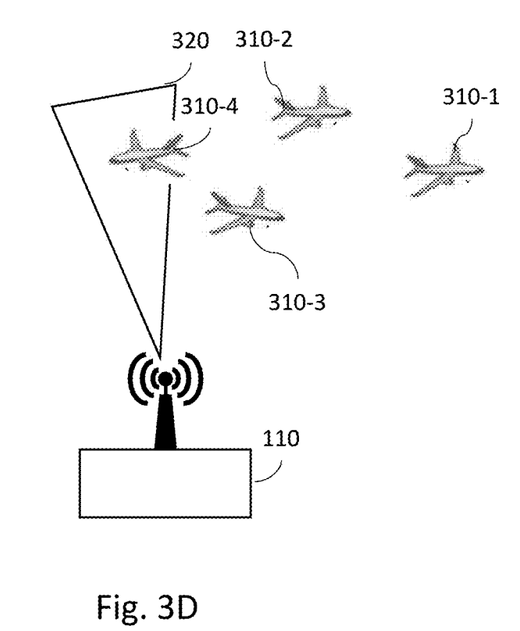

The other aircraft 310-2 and 310-3 are similarly equipped to aircraft 310-1 and are travelling in the same direction as aircraft 310-1. When these aircraft arrive in the proximity of ground station 110 shortly after aircraft 310-1, they need not transmit the weather information they have collected because it should be similar to the weather information already supplied by the first aircraft 310-1. Therefore, in one embodiment, after weather data processing system 20 has successfully received weather data from the first aircraft 310-1, weather information collection manager 28 alters beacon 320 from a permissive beacon 322 to a do-not-transmit beacon 324 as shown in FIG. 3C. Transmission of the do-not-transmit beacon 324 indicates that ground station 110 is not currently open to receive weather information. When the other aircraft 310-2 and 310-3 arrive in the region of airspace where they detect beacon 324, they will refrain from attempting to transmit their weather information to the ground station 110. In one implementation, do-not-transmit beacon 324 is activated and maintained for a specific time duration (for example, 15 minutes) after successful receipt of weather information from aircraft 310-1. In other embodiments, do-not-transmit beacon 324 is maintained until ground station 110 returns to a state open to receiving weather data based one some other criteria.

In some embodiments, one or both of permissive beacon 322 and do-not-transmit beacon 324 include information to indicate which aircraft it is applicable to, for example based on the direction the aircraft is travelling. In other words, for any of the embodiments described herein, ground station 110 may be in a state open to receive data travelling in a first direction, but not open to receive data travelling in a different second direction. As such, in one implementation, beacons 322 and 324 may include a direction flag that indicates a direction of flight. For example, in FIG. 3D, aircraft 310-4 is traveling through a region in which it can detect beacon 320, which includes a direction flag. However, because aircraft 310-4 is travelling in a different direction from that indicated by the direction flag conveyed in beacon 320, it knows that the permissive/do no transmit indication provided by beacon 320 does not apply to it.

Figure 3E:
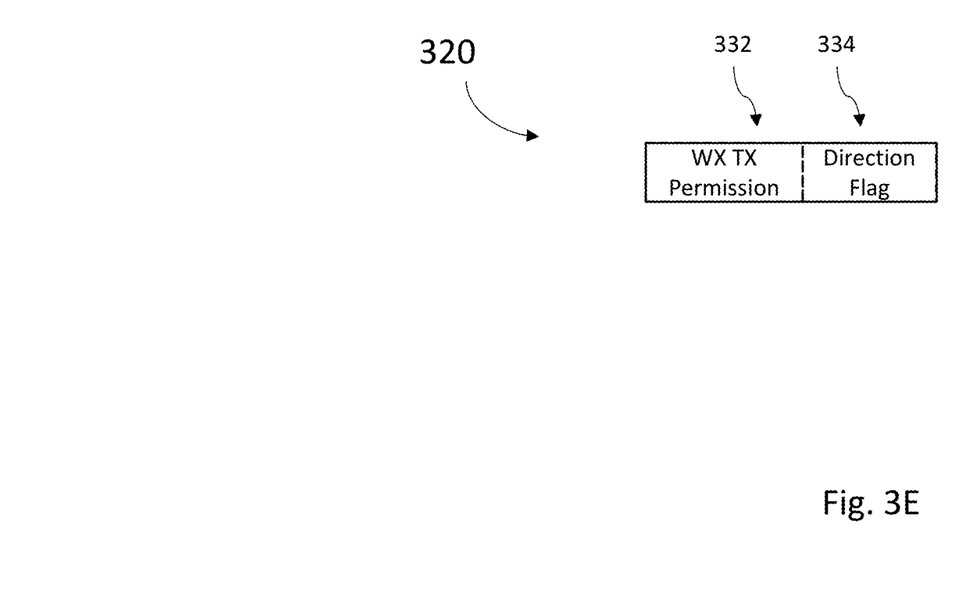

FIG. 3E illustrates one example of a beacon 320 which includes a weather transmit permission indicator 332 as well as optional field for a direction flag 334. When beacon 320 is operating as a permissive beacon 322, the weather transmit permission indicator 332 will convey that an aircraft receiving the signal has permission to transmit weather data to the ground station. When beacon 320 is operating as a do-not-transmit beacon 324, the weather transmit permission indicator 332 will convey that an aircraft receiving the signal should refrain from transmitting weather data to the ground station 110. Direction flag 334 indicates the direction or travel to which the weather transmit permission indicator 332 applies.

Is should be noted that in some embodiments, beacon 320 may operate at one frequency when a permissive beacon, and another frequency when a do-not-transmit beacon 324.

It should also be appreciated that the resolution of direction flags 234 and 334 can be determined based on the number of distinct direction indications desired. For example, a one bit direction flag can distinguish between two directions (e.g. Northbound vs. Southbound travel or Eastbound vs. Westbound), a two bit direction flag can distinguish between four directions (e.g. Northbound vs. Southbound vs. Eastbound vs. Westbound), a three bit direction flag can distinguish between eight directions, and so forth.

Figure 4:
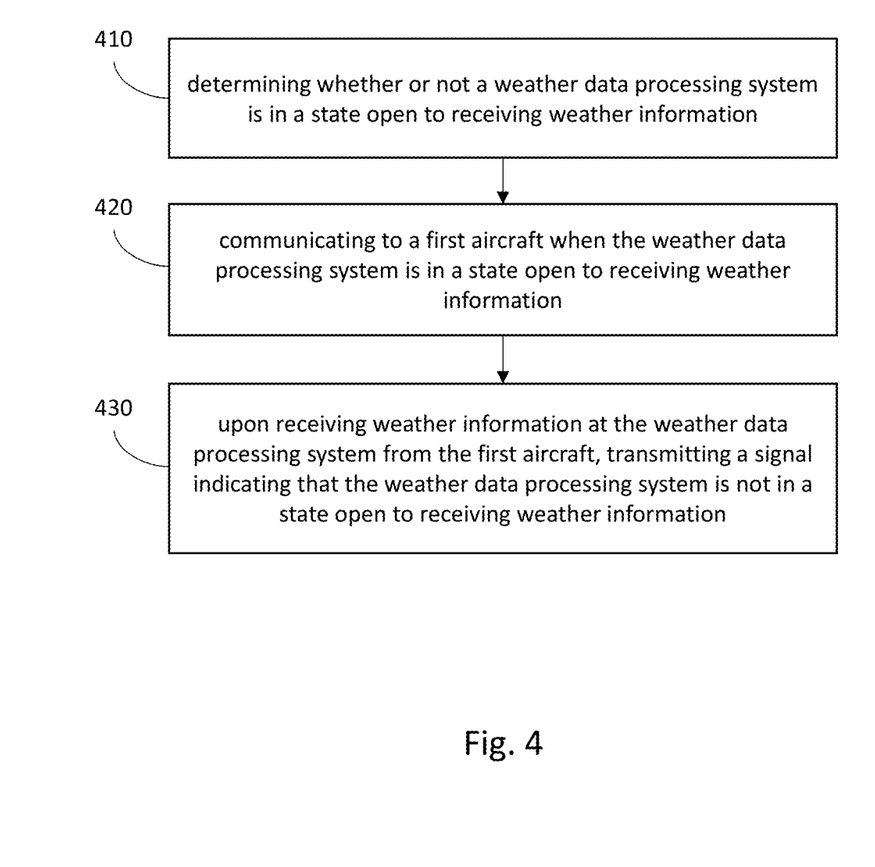
FIG. 4 is a flow chart illustrating a method for regulating weather information collection of one embodiment of the present disclosure.

FIG. 4 is a flowchart illustrating a method 400 embodiment which may be used by or in conjunction with system 100 to implement weather data collection management as described with respect to either FIGS. 2A-2C or FIGS. 3A-3E. The method of 400 may be implemented using one or more elements of the various preceding embodiments described herein and may be used in conjunction with, or in combination with, any of the embodiments described herein. As such, the disclosures provided above with respect to like named elements above apply the method 400 and vise verse.

The method begins at 410 with determining whether or not a weather data processing system is in a state open to receiving weather information. In one embodiment, this determination is made based on an elapsed time since last receiving weather information. As explained above, this determination may take direction into consideration such that the weather data processing system is in a state open to receiving weather information from aircraft traveling in one direction, but not from aircraft traveling in a different direction. The method proceeds to 420 with communicating to a first aircraft when the weather data processing system is in a state open to receiving weather information. Upon receiving weather information at the weather data processing system from the first aircraft, the method proceeds to 430 with transmitting a signal indicating that the weather data processing system is not in a state open to receiving weather information.

In one embodiment, the do-not transmit signal indicating that the weather data processing system is not open to receiving weather information is continuously transmitted for a predetermined period of time. Alternatively, the do-not transmit signal may comprises a time value indicating how the weather data processing system wants aircraft to wait before attempting to transmit weather data. Either way, the do-not-transmit signal is activated to indicate that the weather data processing system is not in a state open to receiving weather information. In some implementations, the do-not-transmit signal may also optionally include a direction flag (indicating a direction of travel for which the do-not-transmit signal applies).

In another implementation of method 400 the communicating to a first aircraft when the weather data processing system is in a state open to receiving weather information further comprises transmitting a localized beacon signal comprising a permissive beacon such as discussed with respect to FIGS. 3A-3E. The beacon signal is referred to as "a localized beacon signal" because it is limited either in power, or direction, or both, so as to only be receivable by aircraft flying through a targeted region of airspace. In such an embodiment, transmitting the signal indicating that the weather data processing system is not in a state open to receiving weather information further comprises changing the localized beacon signal from the permissive beacon to a do-not-transmit beacon. One or both of the permissive beacon and/or the do-not-transmit beacon may comprise a direction flag. As discussed above, a direction flag in either of the beacons can be utilized to indicate a direction of travel for which the respective beacon applies.

Figure 5:
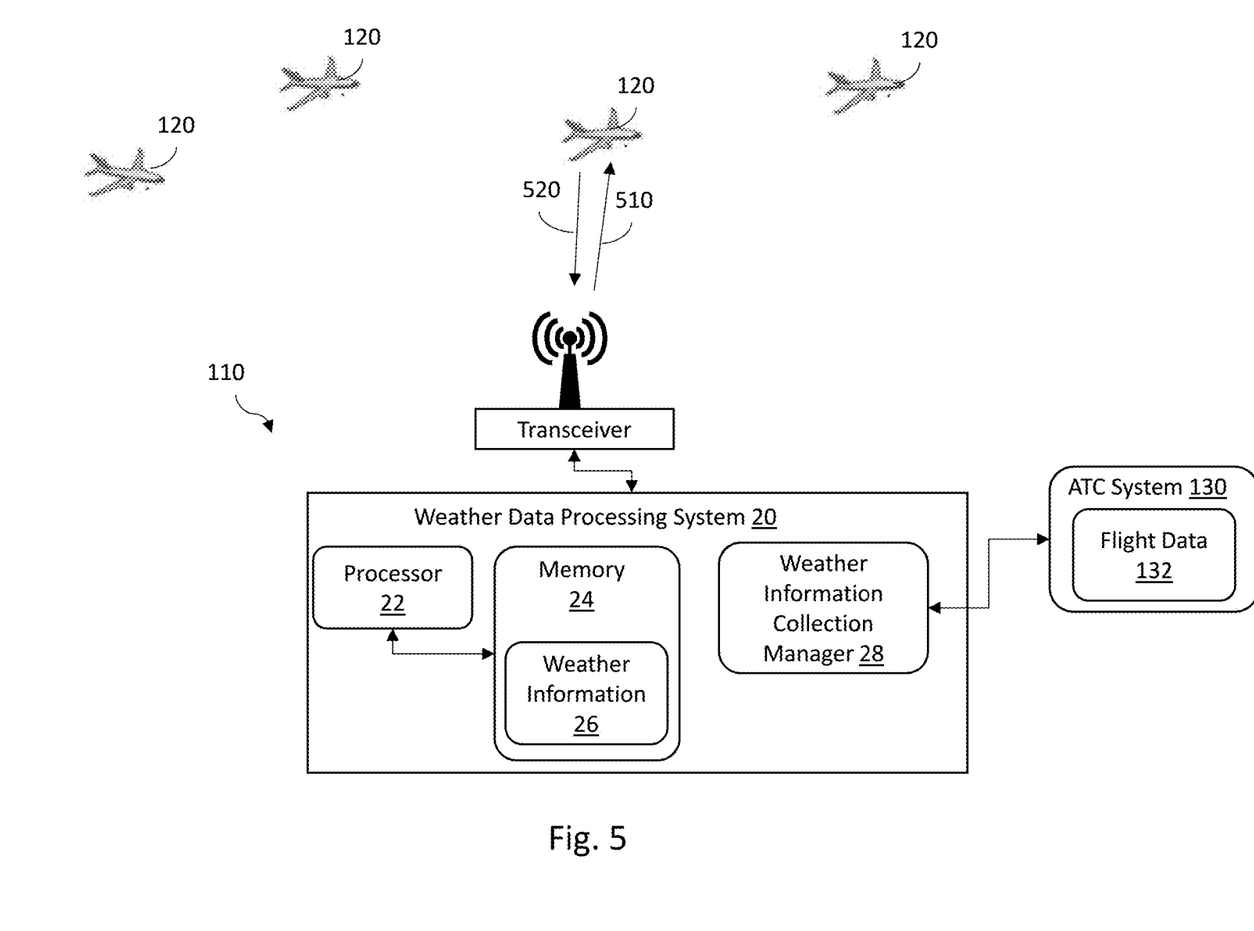
FIG. 5 illustrate another example implementation of a Ground Station Weather Data Collection System of one embodiment of the present disclosure.

FIG. 5 is diagram illustrating another implementation of system 100 in operation in which the ground station 110 utilizes air traffic control flight data to determine which of aircraft 120 are within a threshold proximity of ground station 110. In this embodiment the weather data processing system 20 is coupled to and Air Traffic Control (ATC) system 130 that compiles and provides access to real time flight data 132. The weather information collection manager 28 obtains real time flight information for a plurality of aircraft 120. In one embodiment, real time flight information obtained from ATC system 130 may be stored in memory 24 for access by weather information collection manager 28. The real time flight information may include, for example, one or more of aircraft position, heading, velocity and/or flight plan. Using that real time flight information, weather information collection manager 28 selects one of the aircraft to be a source of on-board collected weather information based on a projection of when that aircraft will be in the proximity of ground station 110. In alternate implementations, the real time flight information may comprise, for example, Automatic Dependent Surveillance-Broadcast (ADS-B) messages, Automatic Dependent Surveillance Contract (ADS-C) and/or RADAR information, or some combination thereof.

The weather information collection manager 28 tracks the selected aircraft so that when it travels within a threshold proximity of ground station 110, it transmits a weather information request uplink message 510 requesting that aircraft transmit its on-board collected weather information. In response, the selected aircraft transmits a weather information downlink message 520 to ground station 110. The weather information downlink 520 may be transmitted, for example, using ACARS datalinks and/or satellite communications (SATCOM) links, or any other communication links available. Once the weather data processing system 20 receives the weather information successfully, weather information collection manager 28 will again foresee and select the next desired aircraft to provide weather information based on the ATC real time flight information received from ATC System 130.

If the selected aircraft arrives but ground station 110 is unable to successfully obtain the weather information after transiting the weather information request uplink message 510, it may resend the request. The weather information collection manager 28 may also (or instead) may access the real time flight data 132 to select another aircraft in place of the first selected aircraft. The replacement selection may be an aircraft already within the operating range of ground station 110, or an aircraft that has not yet crossed the threshold proximity to be within the operating range of ground station 110 but is projected to do so. Similarly, if for some reason the flight path of the selected aircraft is altered so that it will not pass within the operating range/threshold proximity of ground station 110 when expected, the weather information collection manager 28 may access the real time flight data 132 to make a replacement select of another aircraft in place of the first selected aircraft.

Figure 6:
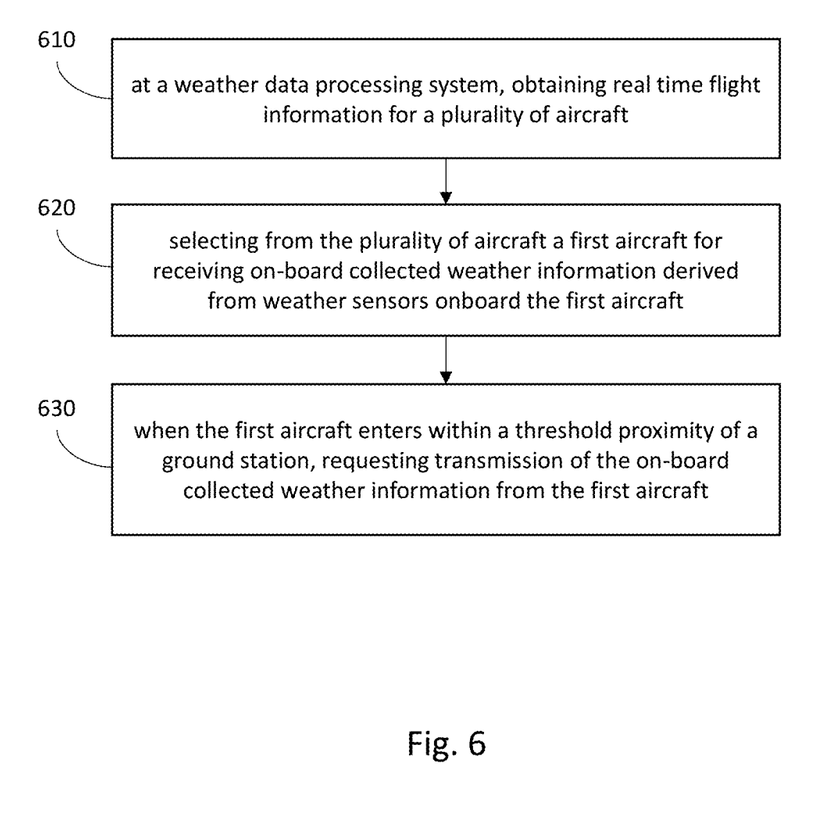
FIG. 6 is a flow chart illustrating a method for regulating weather information collection of one embodiment of the present disclosure.

FIG. 6 is a flowchart illustrating a method 600 embodiment which may be used by or in conjunction with system 100 to implement weather data collection management as described with respect to FIG. 5. The method of 600 may be implemented using one or more elements of the various preceding embodiments described herein and may be used in conjunction with, or in combination with, any of the embodiments described herein. As such, the disclosures provided above with respect to like named elements above apply the method 600 and vise verse.

The method begins at 610 at a weather data processing system, with obtaining real time flight information for a plurality of aircraft. In one embodiment, the real time flight information may be obtained from an Air Traffic Control Flight Data source. The real time flight information may comprise, for example, one or more of: ADS-B information; ADS-C information; and RADAR information for each of the plurality of aircraft. The weather data processing system may be a ground based system located at a ground station 110 such as described above. In one implementation, updates of the real time flight information obtained at 610 is periodically or continuously performed from the Air Traffic Control Flight Data source.

The method proceeds to 620 with selecting from the plurality of aircraft a first aircraft for receiving on-board collected weather information derived from weather sensors onboard the first aircraft. When aircraft are similarly situated, flying through approximately the same airspace and with the same general heading, their on-board weather sensors should be observing and/or experiencing similar weather conditions. It is therefore unnecessary for every aircraft approaching the ground station to transmit its set of on-board generated weather data to the ground station. As such, the selected aircraft should be able to provide weather information collected by on-board weather sensors that is substantially similar to the weather information that has been collected by on-board weather sensors of other situated aircraft.

The method proceeds 630 where when the first aircraft enters within a threshold proximity of a ground station, requesting transmission of the on-board collected weather information from the first aircraft. In other words, one the selected aircraft enters the operating range of the ground station, the ground station may initiate a weather information request uplink message to the selected aircraft. If a weather information containing downlink is successfully received by the ground station, the method may proceed to storing the weather information at the weather data processing system. The method may proceed back to 620 with selecting the next aircraft to request the next weather information containing downlink. In one embodiment, the next aircraft is selected based on a projection that it will arrive in a position to provide weather information to the ground station some predetermined time after reception of weather data from the first selected aircraft was successfully completed. Similarly, when the transmission of the on-board collected weather information from the first aircraft is not successfully completed, the method may also proceed back to 620 to make a replacement selection of another aircraft for downloading weather information.

For both method 400 and 600, the methods may include receiving at the ground station, the requested weather information. The weather information 26 may then be stored in memory 24, to be compiled with other collected weather data, and/or shared with other aircraft. It should be understood that methods 400 and 600 may be implemented using any one of the other embodiments described above. As such, elements of methods 400 and 600 may be used in conjunction with, in combination with, or substituted for elements of the embodiments described above. Further, the functions, structures and other description of elements for such embodiments described in FIGS. 1, 2A-2C, 3A-3E and 5 may apply to like named elements of methods 400 and 600 and vice versa.

Example Embodiments

Example 1 includes a method for managing the collection of weather information, the method comprising: determining whether or not a weather data processing system is in a state open to receiving weather information; communicating to a first aircraft when the weather data processing system is in a state open to receiving weather information; and upon receiving weather information at the weather data processing system from the first aircraft, transmitting a signal indicating that the weather data processing system is not in a state open to receiving weather information.

Example 2 includes the method of example 1, wherein the signal indicating that the weather data processing system is not in a state open to receiving weather information is continuously transmitted for a predetermined period of time.

Example 3 includes the method of any of examples 1-2, wherein the signal indicating that the weather data processing system is not in a state open to receiving weather information comprises a time value indicating how long the weather data processing system will be not in a state open to receiving weather information.

Example 4 includes the method of any of examples 1-3, wherein communicating to a first aircraft when the weather data processing system is in a state open to receiving weather information further comprises deactivating transmission of a do-not-transmit signal; and wherein transmitting the signal indicating that the weather data processing system is not in a state open to receiving weather information further comprises activating transmission of the do-not-transmit signal.

Example 5 includes the method of example 4, wherein the signal indicating that the weather data processing system is not in a state open to receiving weather information comprises a direction flag indicating a direction of travel for which the do-not-transmit signal applies.

Example 6 includes the method of any of examples 1-5, wherein communicating to a first aircraft when the weather data processing system is in a state open to receiving weather information further comprises transmitting a localized beacon signal comprising a permissive beacon; and wherein transmitting the signal indicating that the weather data processing system is not in a state open to receiving weather information further comprises changing the localized beacon signal from the permissive beacon to a do-not-transmit beacon.

Example 6 includes the method of example 6, wherein at least one of the permissive beacon or the do-not-transmit beacon comprises a direction flag indicating a direction of travel for which the respective permissive beacon or the do-not-transmit beacon applies.

Example 7 includes the method of any of examples 1-7, further comprising: determining when the first aircraft is within a threshold proximity of a ground station; transmitting the weather information to the ground station when the first aircraft is within the threshold proximity of the ground station and the first aircraft has not received a do-not-transmit signal.

Example 9 includes a method for managing the collection of weather information, the method comprising: at a weather data processing system, obtaining real time flight information for a plurality of aircraft; selecting from the plurality of aircraft a first aircraft for receiving on-board collected weather information derived from weather sensors onboard the first aircraft; when the first aircraft enters within a threshold proximity of a ground station, requesting transmission of the on-board collected weather information from the first aircraft.

Example 10 includes the method of example 9, wherein when transmission of the on-board collected weather information from the first aircraft is not successfully completed, the method further comprises: selecting from the plurality of aircraft a second aircraft for receiving on-board collected weather information derived from weather sensors onboard the second aircraft; when the second aircraft enters within the threshold proximity of the ground station, requesting transmission of the on-board collected weather information from the second aircraft.

Example 11 includes the method of any of examples 9-10, the method further comprising: receiving and storing at the weather data processing system, the on-board collected weather information from the first aircraft; selecting from the plurality of aircraft a second aircraft for receiving on-board collected weather information derived from weather sensors onboard the second aircraft; wherein based on the real time flight information, the second aircraft is projected to enter within the threshold proximity of the ground station a predetermined time after receiving the on-board collected weather information from the first aircraft is successfully completed.

Example 12 includes the method of any of examples 9-11, wherein the real time flight information comprises one or more of: Automatic Dependent Surveillance-Broadcast (ADS-B) information; Automatic Dependent Surveillance Contract (ADS-C) information; and RADAR information.

Example 13 includes a system for managing the collection of weather information, the system comprising: at least one transceiver configured to communicate with one or more aircraft via one or more data communication links; a weather data processing system coupled to the at least one transceiver, the weather data processing system comprising a processor coupled to a memory that stores weather information compiled from aircraft collected weather data; wherein the weather data processing system further comprises a weather information collection manager configured to send a signal to the one or more aircraft based on whether the weather data processing system is in a state open to receive weather information; wherein the weather information collection manager is further configured to determine whether or not the weather data processing system is in a state open to receive weather information based at least in part on a duration of time since a prior reception of weather information.

Example 14 includes the system of example 13, wherein when the weather data processing system is not in a state open to receive weather information, the signal comprises a do-not-transmit signal continuously transmitted for a predetermined period of time.

Example 15 includes the system of example 14, wherein the do-not-transmit signal further comprises a direction flag indicating a direction of travel for which the do-not-transmit signal applies.

Example 16 includes the system of any of examples 13-15, wherein when the weather data processing system is not in a state open to receive weather information, the signal comprises a do-not-transmit signal that includes a time value indicating how long the weather data processing system will be not open to receiving weather information.

Example 17 includes the system of any of examples 13-16, wherein the weather information collection manager does not transmit the signal when the weather data processing system is in a state open to receiving weather information.

Example 18 includes the system of any of examples 13-17, wherein the weather information collection manager operates the at least one transceiver to transmit a localized beacon signal; wherein localized beacon signal comprises a permissive beacon when the weather data processing system is in a state open to receive weather information; and wherein localized beacon signal comprises a do-not-transmit beacon when the weather data processing system is not in a state open to receive weather information.

Example 19 includes the system of example 18, wherein the localized beacon signal comprises a direction flag indicating a direction of travel for which the respective permissive beacon or the do-not-transmit beacon applies.

Example 20 includes the system of any of examples 13-19, wherein the weather data processing system is further coupled to a system that provides access to real time flight data for the one or more aircraft; wherein the weather information collection manager is configured to select at least one aircraft for obtaining weather information and track the at least one aircraft based on the real time flight data; and wherein the weather information collection manager is further configured to send a weather information request uplink message to the at least one aircraft when the at least one aircraft enters within a threshold proximity of a ground station.

In various alternative embodiments, system elements, method steps, or examples described throughout this disclosure (such as the weather information ground station, weather data processing system, weather information collection manager or sub-parts thereof, for example) may be implemented using one or more computer systems, field programmable gate arrays (FPGAs), or similar devices comprising a processor coupled to a memory (such as shown in FIG. 1A, for example) and executing code to realize those elements, processes, or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for managing the collection of weather information, the method comprising:

determining a state of a weather data processing system for receiving weather information;

communicating to a first aircraft when the weather data processing system is in a state open to receiving weather information, using at least one transceiver coupled to the weather data processing system and configured to communicate with one or more aircraft via one or more data communication links, the weather data processing system comprising a processor coupled to a memory that stores weather information compiled from aircraft collected weather data; and upon receiving weather information at the weather data processing system from the first aircraft, transmitting a signal indicating that the weather data processing system is not in a state open to receiving weather information, wherein the weather data processing system further comprises a weather information collection manager configured to send the signal to the one or more aircraft indicating the state of the weather data processing system for receiving weather information transmitted from the one or more aircraft;

wherein the weather information collection manager is further configured to determine the state of the weather data processing system for receiving weather information based at least in part on a duration of time since a prior reception of weather information;

wherein to indicate when the weather data processing system is not in a state open to receive weather information, the signal is configured to comprise a do-not-transmit signal indicating that the weather data processing system is not in a state open to receiving weather information, wherein the do-not-transmit signal comprises a direction flag indicating a direction of travel for which the do-not-transmit signal applies; and wherein the one or more aircraft receiving said do-not-transmit signal and travelling in the indicated direction of travel are instructed by the do-not-transmit signal not to transmit any weather data to the weather data processing system.

2. The method of claim 1, wherein the signal indicating that the weather data processing system is not in a state open to receiving weather information is continuously transmitted for a predetermined period of time.

3. The method of claim 1, wherein the signal indicating that the weather data processing system is not in a state open to receiving weather information comprises a time value indicating how long the weather data processing system will be not in a state open to receiving weather information.

4. The method of claim 1, wherein communicating to a first aircraft when the weather data processing system is in a state open to receiving weather information further comprises deactivating transmission of the do-not-transmit signal; and wherein transmitting the signal indicating that the weather data processing system is not in a state open to receiving weather information further comprises activating transmission of the do-not-transmit signal.

5. The method of claim 4, wherein the signal indicating that the weather data processing system is not in a state open to receiving weather information comprises a direction flag indicating a direction of travel for which the do-not-transmit signal applies.

6. The method of claim 1, wherein communicating to a first aircraft when the weather data processing system is in a state open to receiving weather information further comprises transmitting a localized beacon signal comprising a permissive beacon; and wherein transmitting the signal indicating that the weather data processing system is not in a state open to receiving weather information further comprises changing the localized beacon signal from the permissive beacon to a do-not-transmit beacon.

7. The method of claim 6, wherein at least one of the permissive beacon or the do-not-transmit beacon comprises a direction flag indicating a direction of travel for which the respective permissive beacon or the do-not-transmit beacon applies.

8. The method of claim 1, further comprising: determining when the first aircraft is within a threshold proximity of a ground station; transmitting the weather information to the ground station when the first aircraft is within the threshold proximity of the ground station and the first aircraft has not received a do-not-transmit signal.

9. The method of claim 1, further comprising: at a weather data processing system, obtaining real time flight information for a plurality of aircraft; selecting from the plurality of aircraft the first aircraft for receiving onboard collected weather information derived from weather sensors onboard the first aircraft; when the first aircraft enters within a threshold proximity of a ground station, requesting transmission of the on-board collected weather information from the first aircraft.

10. The method of claim 9, wherein when transmission of the on-board collected weather information from the first aircraft is not successfully completed, the method further comprises: selecting from the plurality of aircraft a second aircraft for receiving onboard collected weather information derived from weather sensors onboard the second aircraft; when the second aircraft enters within the threshold proximity of the ground station, requesting transmission of the on-board collected weather information from the second aircraft.

11. The method of claim 9, the method further comprising: receiving and storing at the weather data processing system, the on-board collected weather information from the first aircraft; selecting from the plurality of aircraft a second aircraft for receiving onboard collected weather information derived from weather sensors onboard the second aircraft; wherein based on the real time flight information, the second aircraft is projected to enter within the threshold proximity of the ground station a predetermined time after receiving the on-board collected weather information from the first aircraft is successfully completed.

12. The method of claim 9, wherein the real time flight information comprises one or more of: Automatic Dependent Surveillance-Broadcast (ADS-B) information; Automatic Dependent Surveillance Contract (ADS-C) information; and RADAR information.

13. A system for managing the collection of weather information, the system comprising:

at least one transceiver configured to communicate with one or more aircraft via one or more data communication links;

a weather data processing system coupled to the at least one transceiver, the weather data processing system comprising a processor coupled to a memory that stores weather information compiled from aircraft collected weather data;

wherein the weather data processing system further comprises a weather information collection manager configured to send a signal to the one or more aircraft indicating the state of the weather data processing system for receiving weather information transmitted from the one or more aircraft;

wherein the weather information collection manager is further configured to determine the state of the weather data processing system for receiving weather information based at least in part on a duration of time since a prior reception of weather information;

wherein to indicate when the weather data processing system is not in a state open to receive weather information, the signal is configured to comprise a do-not-transmit signal indicating that the weather data processing system is not in a state open to receiving weather information, wherein the do-not-transmit signal comprises a direction flag indicating a direction of travel for which the do-not-transmit signal applies; and wherein the one or more aircraft receiving said do-not-transmit signal and travelling in the indicated direction of travel are instructed by the do-not-transmit signal not to transmit any weather data to the weather data processing system.

14. The system of claim 13, wherein when the weather data processing system is not in a state open to receive weather information, the signal comprises a do-not-transmit signal continuously transmitted for a predetermined period of time.

15. The system of claim 13, wherein when the weather data processing system is not in a state open to receive weather information, the signal comprises a do-not-transmit signal indicating that the weather data processing system is not in a state open to receiving weather information and includes a time value indicating how long the weather data processing system will be not open to receiving weather information.

16. The system of claim 13, wherein the weather information collection manager does not transmit the signal when the weather data processing system is in a state open to receiving weather information.

17. The system of claim 13, wherein the weather information collection manager operates the at least one transceiver to transmit a localized beacon signal either transmitted at a low power or comprising a highly-directional beam, or both, such that only an aircraft flying through a specifically designated region of airspace will receive the signal;
wherein localized beacon signal comprises a permissive beacon indicating that aircraft have permission to transmit weather data to the weather data processing system when the weather data processing system is in a state open to receive weather information; and
wherein localized beacon signal comprises a do-not-transmit beacon indicating that aircraft have no permission to transmit weather data to the weather data processing system when the weather data processing system is not in a state open to receive weather information.

18. The system of claim 17, wherein the localized beacon signal comprises the direction flag further indicating the direction of aircraft travel for which the respective permissive beacon or the do-not-transmit beacon applies.

19. The system of claim 13, wherein the weather data processing system is further coupled to a system that provides access to real time flight data for the one or more aircraft;
wherein the weather information collection manager is configured to select at least one aircraft for obtaining weather information and track the at least one aircraft based on the real time flight data; and
wherein the weather information collection manager is further configured to send a weather information request uplink message to the at least one aircraft when the at least one aircraft enters within a threshold proximity of a ground station.

* * * * *